W. G. LAIRD.
THERMOMETER READER.
APPLICATION FILED AUG. 14, 1918.

1,367,879.

Patented Feb. 8, 1921.

Inventor
Wilbur G. Laird
By His Attorney
Edmund G. Borden

UNITED STATES PATENT OFFICE.

WILBUR G. LAIRD, OF NEW YORK, N. Y., ASSIGNOR TO HENRY L. DOHERTY, OF NEW YORK, N. Y.

THERMOMETER-READER.

1,367,879. Specification of Letters Patent. Patented Feb. 8, 1921.

Application filed August 14, 1918. Serial No. 249,785.

*To all whom it may concern:*

Be it known that I, WILBUR G. LAIRD, a citizen of the United States, residing at New York city, in the county of New York, State of New York, have invented certain new and useful Improvements in Thermometer-Readers; and I do hereby declare the following to be a full, clear, and exact description of the invention, such as will enable others skilled in the art to which it appertains to make and use the same.

This invention relates to thermometer readers and more particularly to readers for thermometers having calibrations which are positioned very closely to one another.

The object of the invention is to provide a thermometer reader which is simple in construction, easy to manipulate, and effective for making accurate readings.

With this and other objects in view the invention consists in the improved thermometer reader hereinafter described and claimed.

Figure 1:
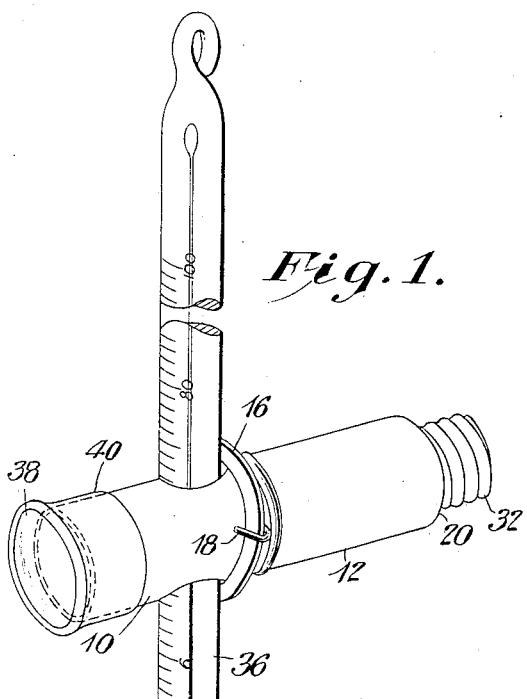
Figure 2:
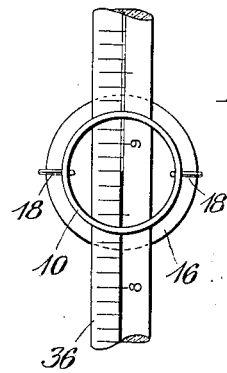
Figure 3:
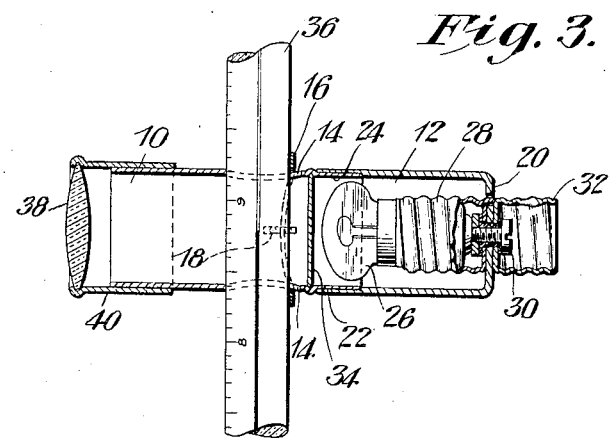

The various features of the invention are illustrated in the accompanying drawings, in which, Figure 1 is a view in perspective of a thermometer reader embodying the preferred form of the invention, which is mounted upon the stem of a thermometer;

Fig. 2 is a view in front elevation of the thermometer reader shown in position on a thermometer stem; and Fig. 3 is a view in vertical section of the thermometer reader.

The thermometer reader illustrated in the drawings is arranged to be mounted on the stem of a thermometer in such a manner that it may be moved up and down the stem to follow the position of the temperature-registering thread and to be frictionally held in any desired position. The reader consists of a cylindrical barrel having a thermometer compartment 10 and an illuminating compartment 12. The barrel is preferably made of celluloid or other esters of cellulose which are easily molded in any desired shape. An opening 14 is formed in the rear end of the thermometer compartment which extends transversely through the barrel and is arranged to receive the stem of a thermometer. The opening 14 preferably has an area larger than the cross-sectional area of the largest thermometer which is to be used therein and the reader is held in position upon a thermometer stem by means of a clamp 16. The clamp 16 is secured on the barrel by means of staples 18 and arranged to yieldingly engage the rear face of the thermometer stem to frictionally bind it against the front edge of the barrel opening 14.

The illuminating compartment 12 consists of a cap containing an illuminating device which is arranged to be removably mounted on the thermometer compartment so that the cap may be removed to permit inspection of the illuminating device. The cap has a closed end 20 and an open end 22, the open end being arranged to make a telescopic joint with a flange 24 projecting rearwardly from the thermometer compartment. The illuminating device consists of an electric lamp 26 of low candle power which is mounted in a lighting socket 28 secured to the inner side of the cap-end 20. The socket 28 is held in position by a terminal screw 30, and a socket 32 similar to the socket 28 is secured to the outer side of the cap-end 20 by means of the terminal screw 30. The socket 32 is arranged to receive an electric circuit plug for furnishing electric current to the lamp 30. To diffuse the light of the lamp 30 and give a dull illuminated background against which to read the thermometer, a translucent partition 34 is positioned within the barrel between the thermometer compartment and the illuminating compartment.

The front end of the thermometer compartment 10 is open and when a thermometer stem 36 is in position in the opening 14, an observer in front of the stem, viewing Fig. 2, may easily position the end of the temperature-registering thread within the illuminated barrel. The observation through the open end of a cylindrical barrel further assists in bringing the end of the thermometer thread into the center of the barrel and in this way parallax in reading the calibrations may be avoided. A reading lens 38 is mounted on one end of a cylinder 40 which is telescopically mounted on the barrel of the thermometer compartment 10. This construction permits the lens 38 to be properly focused on the thermometer stem. If desired, the cylinder 40 and lens 38 may be removed and the position of the thermometer thread may be observed with a large reading lens which would be held by the observer.

From the above construction it will be seen that the thermometer reader is very simple in construction and may be easily manipulated to follow the temperature-registering thread of the thermometer. The thermometer stem is effectively illuminated and the cylindrical barrel assists in centering the end of the temperature-registering thread for making a reading. The reader is very light in weight so that it is easily held in any vertical position on the stem and does not put a heavy stress on the thermometer.

The preferred form of the invention having been thus described, what is claimed as new is:

1. A thermometer reader comprising a hollow barrel arranged to be adjustably mounted on a thermometer stem with the stem passing through the barrel, one end of said barrel being open for observing a thermometer stem, and an illuminating device carried by said barrel in position to illuminate a thermometer stem only on the side of the stem opposite said barrel opening.

2. A thermometer reader comprising a barrel provided with an opening to receive a thermometer stem, an illuminating device positioned within said barrel, and a translucent partition positioned between the thermometer stem opening and the illuminating device.

3. A thermometer reader comprising a barrel provided with an opening to receive a thermometer stem, an illuminating device positioned within said barrel, and means for holding said barrel in position on a thermometer stem.

4. A thermometer reader comprising a barrel provided with an opening to receive a thermometer stem, an illuminating device positioned within said barrel, and a clamp secured to said barrel for frictionally holding the barrel on a thermometer stem.

5. A thermometer reader consisting of a cylindrical barrel having a thermometer compartment and an illuminating compartment, a translucent partition separating said compartments, said thermometer compartment having an open end and provided with a transverse opening to receive a thermometer stem, an illuminating device in said illuminating compartment, and a clamp mounted on said barrel adjacent said thermometer opening for holding said barrel in position on a thermometer stem.

6. A thermometer reader comprising a barrel having an open end and provided with a transverse opening to receive a thermometer stem, an illuminating device positioned within the barrel between said thermometer stem opening and the other end of said barrel, and a reading lens mounted on the open end of the barrel.

In testimony whereof I affix my signature.

WILBUR G. LAIRD.